United States Patent [19]

Girvan

[11] Patent Number: 5,676,844

[45] Date of Patent: Oct. 14, 1997

[54] METHOD OF TREATING WATER

[76] Inventor: Don H. Girvan, 5417 Riverwood Rd., St. Augustine, Fla. 32092

[21] Appl. No.: 608,242

[22] Filed: Feb. 28, 1996

Related U.S. Application Data

[60] Provisional application No. 60/002,141, Aug. 11, 1995.
[51] Int. Cl.$^6$ .................................. C02F 1/50; C02F 1/76
[52] U.S. Cl. ........................................ 210/756; 210/764
[58] Field of Search ........................................ 210/764, 756

[56] References Cited

U.S. PATENT DOCUMENTS

| | | |
|---|---|---|
| 3,793,216 | 2/1974 | Dychdala et al. . |
| 4,048,351 | 9/1977 | Saeman et al. . |
| 4,146,676 | 3/1979 | Saeman et al. . |
| 4,747,978 | 5/1988 | Loehr et al. . |

*Primary Examiner*—Neil McCarthy
*Attorney, Agent, or Firm*—Jones & Askew, LLP

[57] ABSTRACT

The present invention is a method of treating a standing water system comprising the administration to the standing water system of an admixture comprising calcium hypochlorite and borate salts. The method of treating a standing water system provides free chlorine to the system more efficiently than prior art methods, stabilizes the pH of the standing water system, and reduces the undesired side effects of the addition of calcium hypochlorite alone.

6 Claims, No Drawings

METHOD OF TREATING WATER

TECHNICAL FIELD

This invention containing at least 25% by weight of a tetraborate or tetraborate/boric acid and the remaining components of the composition being calcium hypochlorite $Ca(OCl)_2$. The composition can be used to treat waters such as swimming pools, spas, cooling towers and the like. The composition further comprises the alkaline metal tetraborate and optionally boric acid mixed with calcium hypochlorite.

BACKGROUND OF THE INVENTION

Sodium tetraborate has long been known to be effective as an algaecide and a fungicide in standing water systems such as swimming pools, drinking water reservoirs, and cooling towers and is the subject of U.S. Pat. Nos. 4,594,091 and 5,131,938, both to Girvan, both of which are incorporated herein by reference in their entirety. It has been found that the alkaline metal, tetraborate, by itself improves the treatment of standing water systems in several ways. The tetraborate solutions plus dissolved carbon dioxide with produce sodium carbonate plus sodium bicarbonate thereby lowering the $CO_2$ concentration in the water and making it difficult for algae to germinate in the water. The tetraborates have also been shown to react with dissolved halides in the water to give off free halogen. Finally, the tetraborates increase the solubility of most other salts that may be added to the standing water system.

Another additive that is commonly used to treat standing water is calcium hypochlorite. Calcium hypochlorite is added to water and, when dissolved in water, provides a source of chlorine for disinfectant purposes and for general sanitation. Several commercial processes are currently used for the manufacture of the so-called "high-grade" calcium hypochlorite compositions containing at least 65% calcium hypochlorite from which the chlorine for sanitation purposes is derived. Several of these processes are described in U.S. Pat. No. 3,793,216 which is incorporated herein by reference in its entirety. The '216 patent discloses a calcium hypochlorite composition comprising at least 55% calcium hypochlorite mixed with water soluble, hydrated inorganic salts in an amount sufficient to provide a water content in the total mixture in the range of about 3% to about 13%. Included in the disclosure as one of the hydrated inorganic salts are the salts containing tetraborate. The focus of the '216 patent is to reduce the flammability of the calcium hypochlorite. The major disadvantage of the essentially water-free calcium hypochlorite compositions is the danger intended thereto if contacted by external contaminants, which contamination causes exothermic decomposition of the material regardless of the temperature. For example, if any portion of a batch of said calcium hypochlorite, whether in a small container, large drum or uncontained mass, reaches a temperature of about 350° F., it will undergo a self-sustaining and self-propagating decomposition which will spread through the entire batch until decomposition is complete. Decomposition may be initiated by the accidental touching of a live flame or spark to the calcium hypochlorite composition, as for example, the accidental contact of a lit match or cigarette. Decomposition may also be initiated by contacting the hypochlorite with just a single drop of organic material, for example, glycerin, and alcohol, a variety of hydrocarbons such as petroleum oil and many others. The decomposition of all gaseous chlorine which constitutes a toxic hazard to personnel in the area, and also involves oxygen, which intensifies a fire that might reach stored quantities of calcium hypochlorite. Because oxygen is released in the decomposition process, attempts to smother a—hypochlorite fire will be unsuccessful. The '216 patent thus describes a composition which reduces the likelihood of spontaneous decomposition of the calcium hypochlorite composition. However, the '216 patent does not disclose any other properties of a composition comprising calcium hypochlorite and an alkaline metal tetraborate and/or boric acid.

What is needed in the industry is a composition that will stabilize pH of the water, will reduce the presence of algae and other microorganisms which normally grow in standing water, and will provide a source of halogens which will further sanitize the water solution.

SUMMARY OF THE INVENTION

The present invention is a calcium hypochlorite/alkaline metal tetraborate or a calcium hypochlorite/alkaline metal tetraborate/boric acid composition which can be used to treat standing water systems such as swimming pools, spas, cooling towers and the like. The method of treating water of the present invention comprises the addition of the calcium hypochlorite/tetraborate and/or boric acid composition to the water periodically to stabilize pH and to increase the available chlorine to the water. It has been found that the calcium hypochlorite/tetraborate and/or boric acid composition act synergistically to reduce the growth of microorganisms in the water, reduce the cloudy scale on the sides of the water container that normally occurs when only calcium hypochlorite is added to the water and reduces the calcification of filters, especially sand filters.

Accordingly, it is an object of the present invention to provide a method for treating standing water systems such as swimming pools, spas, and cooling towers by administering a composition comprising calcium hypochlorite and an alkaline metal tetraborate or calcium hypochlorite and a combination of an alkaline metal hypochlorite and boric acid.

It is further an object of the present invention to provide a method for treating standing water systems which will increase the availability of free chlorine to the system.

It is yet another object of the present invention to provide a method for treating standing water systems with a calcium hypochlorite composition wherein the cloudiness of the water is reduced.

It is yet another object of the present invention to provide a method for treating standing water systems with a calcium hypochlorite solution wherein the scale on the sides of the water container are reduced. It is another object of the present invention to provide a method for treating standing water (the normal cost of a calcium hypochlorite treatment of the standing water system is reduced).

These and other objects, features and advantages of the present invention will become apparent after a review of the following detailed description of the disclosed embodiments.

DETAILED DESCRIPTION

The present invention comprises a method for treating standing water systems with a composition comprising calcium hypochlorite and .an alkaline metal borate. The borate is preferably an alkaline metal tetraborate pentahydrate, an alkaline metal tetraborate dehydrate an alkaline metal tetraborate pentahydrate. The alkaline metal can be any alkaline metal that is compatible with the borate ion. These alkaline metals include sodium, potassium, and lithium. The composition that can be used in the method of the present invention also includes a calcium hypochlorite and a borate with boric acid. The combination of alkaline metal, borate and the boric acid can be in the ratio of 5% to 95% borate to boric acid by weight. In the composition for use in the method of the present invention, the composition comprises between approximately 60% and 80% calcium hypochlorite and between approximately 20% and 40% of the borate molecule. Again, it is contemplated that by the term borate molecule, as used herein, the borate molecule can be any of the borate ions or it can be a combination of the borate ion and boric acid.

The prepare the calcium hypochlorite/borate composition, the compositions are prepared by mixing the particular ingredients uniformly in a powder blender that is, measured amounts of the calcium hypochlorite with varying, measured amounts of the borate salt and/or the boric acid combination. It is important to note that the composition should be uniformly mixed so that the resulting composition is a powder. The composition can be further processed by compressing it into convenient tabs that can be added to the standing water system. Methods of producing these tabs are well known to those of ordinary skill in the art. The calcium hypochlorite that is preferably used in the present invention is commercially available and contains on the order of at least about 65%, normally about 70–78%, and in some cases up to 85% or more by weight of calcium hypochlorite, the remaining constituents being sodium chloride, calcium chlorate, calcium hydroxide, calcium carbonate and calcium chloride. However, the products are always referred to in the trade as "calcium hypochlorite."

The term "standing water system" includes, but is not limited to, swimming pools, spas, hot water tubs, cooling tower systems, foot baths, drinking water reservoirs and the like. The present invention is contemplated as being used in any standing water system wherein pH is desirably maintained at a stable value, the growth of microorganisms is desirably inhibited, and the clarity of the standing water system is desirably maintained.

In performing the method of treating water according to the present invention, the calcium hypochlorite/borate composition is administered to the water, that is the standing water system at a final concentration of between approximately 0.5 to 10 pounds per approximately 10,000 gallons of water. Preferably, the final concentration of calcium hypochlorite/borate composition is between approximately 1 and 3 pounds per 10,000 gallons of water. Most preferably, the concentration of calcium hypochlorite/borate composition is approximately 2 pounds per approximately 10,000 gallons of water. For swimming pool treatment, the water is treated preferably between 1 and 7 times per week. The method of treating standing water of the present invention has several advantages over the use of calcium hypochlorite by itself. As disclosed in the U.S. Pat. No. 3,793,216, the composition of calcium hypochlorite with borate is much less reactive when in contact with organic material and is therefore much safer to use. However, it is not taught or disclosed in the '216 patent that the composition comprising calcium hypochlorite and borates allows one to use approximately 30% less calcium hypochlorite to obtain the same beneficial effects as calcium hypochlorite alone, that the problems of water cloudiness using calcium hypochlorite alone are reduced or eliminated; that the normal problem of scale build-up on the sides of the standing water container are reduced or eliminated; that the calcification of water filters for the standing water system is reduced or eliminated; and that the availability of free chlorine to the standing water system is increased; and that the pH of the standing water system is stabilized at more neutral pH then when calcium hypochlorite is added to the water alone.

It should be understood, of course, that the foregoing relates only to preferred embodiments of the present invention and that numerous modifications or alterations may be made therein without departing from the spirit and the scope of the invention.

I claim:

1. A method of reducing microbial growth in a standing water system comprising the administration of an admixture comprising an effective amount of calcium hypochlorite and an effective amount of a mixture comprising borate salt and boric acid.

2. The method of claim 1 wherein the admixture is administered to the standing water system so that the final concentration of the admixture is between approximately 0.5 and 10 pounds per 10,000 gallons of water.

3. The method of claim 2, wherein the concentration of the admixture in the standing water system is between approximately 1 and 5 pounds per 10,000 gallons of water.

4. The method of claim 1 wherein the borate salt comprises, sodium tetraborate pentahydrate, sodium tetraborate octahydrate, sodium tetraborate decahydrate, lithium tetraborate pentahydrate, or potassium tetraborate octahydrate.

5. The method of claim 1 wherein the borate salt is sodium tetraborate octahydrate.

6. The method of claim 1 wherein the calcium hypochlorite in the admixture is between approximately 60% and 80% by weight.

* * * * *